(12) United States Patent
Gudmundsson et al.

(10) Patent No.: US 10,725,191 B2
(45) Date of Patent: Jul. 28, 2020

(54) METHOD AND APPARATUS FOR SIMULTANEOUS INDUCTIVE EXCITATION AND LOCATING OF UTILITIES

(71) Applicant: OPTIMAL RANGING, INC., Santa Clara, CA (US)

(72) Inventors: Thorkell Gudmundsson, San Jose, CA (US); James W. Waite, Los Gatos, CA (US); Dimitar Gargov, Merced, CA (US)

(73) Assignee: OPTIMAL RANGING, INC., Santa Clara, CA (US)

( * ) Notice: Subject to any disclaimer, the term of this patent is extended or adjusted under 35 U.S.C. 154(b) by 0 days.

(21) Appl. No.: 15/895,785

(22) Filed: Feb. 13, 2018

(65) Prior Publication Data

US 2018/0172867 A1   Jun. 21, 2018

Related U.S. Application Data

(63) Continuation-in-part of application No. 15/616,704, filed on Jun. 7, 2017.

(60) Provisional application No. 62/347,814, filed on Jun. 9, 2016.

(51) Int. Cl.
*G01V 3/08* (2006.01)
*G01V 3/10* (2006.01)

(52) U.S. Cl.
CPC ............. *G01V 3/081* (2013.01); *G01V 3/104* (2013.01)

(58) Field of Classification Search
CPC ........ G01S 13/06; G01S 13/885; G01S 13/89; G01V 3/08; G01V 3/081; G01V 3/088; G01V 3/10; G01V 3/104; G01V 3/105; G01V 3/107; G01V 3/108; G01V 3/15; G01V 3/165; G01V 3/14
USPC .......................... 324/326, 327, 329, 334–337
See application file for complete search history.

(56) References Cited

U.S. PATENT DOCUMENTS

| | | | | |
|---|---|---|---|---|
| 3,617,865 A | * | 11/1971 | Hakata .................. | G01V 3/104 324/258 |
| 4,390,836 A | * | 6/1983 | Bruce ...................... | G01V 3/06 324/326 |
| 4,600,356 A | | 7/1986 | Bridges et al. | |
| 4,843,324 A | * | 6/1989 | Humphreys, Jr. ..... | G01V 3/104 324/326 |

(Continued)

FOREIGN PATENT DOCUMENTS

| | | |
|---|---|---|
| GB | 2220071 A | 12/1989 |
| WO | 2014093096 A1 | 6/2014 |

OTHER PUBLICATIONS

B. Candy, "Metal Detector Basics and Theory," Minelab.com, pp. 1-24.

(Continued)

*Primary Examiner* — Steven L Yeninas
(74) *Attorney, Agent, or Firm* — Haynes and Boone, LLP

(57) ABSTRACT

A locating system is presented. In some embodiments, the locating system includes a first platform, the first platform including a transmitter capable of inducing a current in a line; a second platform, the second platform including a receiver capable of detecting the current in the line; and a processor coupled to the first platform and the second platform, the processor directing the first platform and the second platform to control their motion over the line and collecting location data of the line.

27 Claims, 9 Drawing Sheets

(56) References Cited

U.S. PATENT DOCUMENTS

| | | | | |
|---|---|---|---|---|
| 5,654,637 | A * | 8/1997 | McNeill | G01V 3/107 324/329 |
| 6,140,819 | A | 10/2000 | Peterman et al. | |
| 7,120,564 | B2 * | 10/2006 | Pacey | G01V 3/08 702/193 |
| 7,356,421 | B2 | 4/2008 | Gudmundsson et al. | |
| 8,264,226 | B1 * | 9/2012 | Olsson | G01V 3/15 324/329 |
| 9,612,323 | B2 * | 4/2017 | Ishimori | G08G 1/165 |
| 10,025,315 | B2 * | 7/2018 | Klinger | B64C 39/024 |
| 2003/0189427 | A1 * | 10/2003 | Oristaglio | G01V 3/10 324/326 |
| 2005/0237061 | A1 | 10/2005 | Cloutier et al. | |
| 2006/0036376 | A1 * | 2/2006 | Gudmundsson | G01V 3/081 702/38 |
| 2006/0055584 | A1 | 3/2006 | Waite et al. | |
| 2008/0018334 | A1 | 1/2008 | Reiderman | |
| 2010/0141261 | A1 * | 6/2010 | Overby | G01V 3/12 324/329 |
| 2010/0188088 | A1 * | 7/2010 | Nielsen | G06Q 10/06 324/329 |
| 2011/0156957 | A1 * | 6/2011 | Waite | G01S 5/0221 342/450 |
| 2013/0200901 | A1 * | 8/2013 | Olsson | G01V 3/081 324/326 |
| 2014/0266213 | A1 * | 9/2014 | Olsson | G01V 3/17 324/329 |
| 2017/0307670 | A1 * | 10/2017 | Olsson | G01R 29/085 |
| 2017/0363764 | A1 * | 12/2017 | Aldridge | G01V 3/165 |

OTHER PUBLICATIONS

R. Fletcher, "Practical Methods of Optimization," A Wiley-Interscience Publication, John Wiley & Sons, 1987, Book, www.wileyeurope.com.

I. S. Grant and W.R. Phillips, "Electromagnetism (2nd ed.)," Manchester Physics, John Wiley & Sons, 2008, Book.

Grewal and Andrews, "Kalman Filtering: Theory and Practice Using MATLAB," 2nd edition, Wiley, 2001, Book, pp. 1-401.

David C. Jiles, "Introduction to Magnetism and Magnetic Materials (2 ed.)", CRC Press1998, Book.

Unknown, "Laying Pipes and Cables and Meeting the Challenge of Finding Them Again Afterwards," Maritime Journal, Apr. 27, 2015, pp. 1-3, www.maritimejournal.com.

Unknown, Submarine Medium Voltage Cables, Nexans, 2013, pp. 1-3, www.nexans.co.uk.

International Search Report for PCT Application No. PCT/US2017/036483 Issued by the U.S. International Searching Authority dated Sep. 13, 2017; pp. 1-2.

Written Opinion for PCT Application No. PCT/US2017/036483 Issued by the U.S. International Searching Authority dated Sep. 13, 2017; pp. 1-8.

Supplementary European Search Report from 17810991.4, dated Apr. 9, 2020, pp. 1-7.

\* cited by examiner

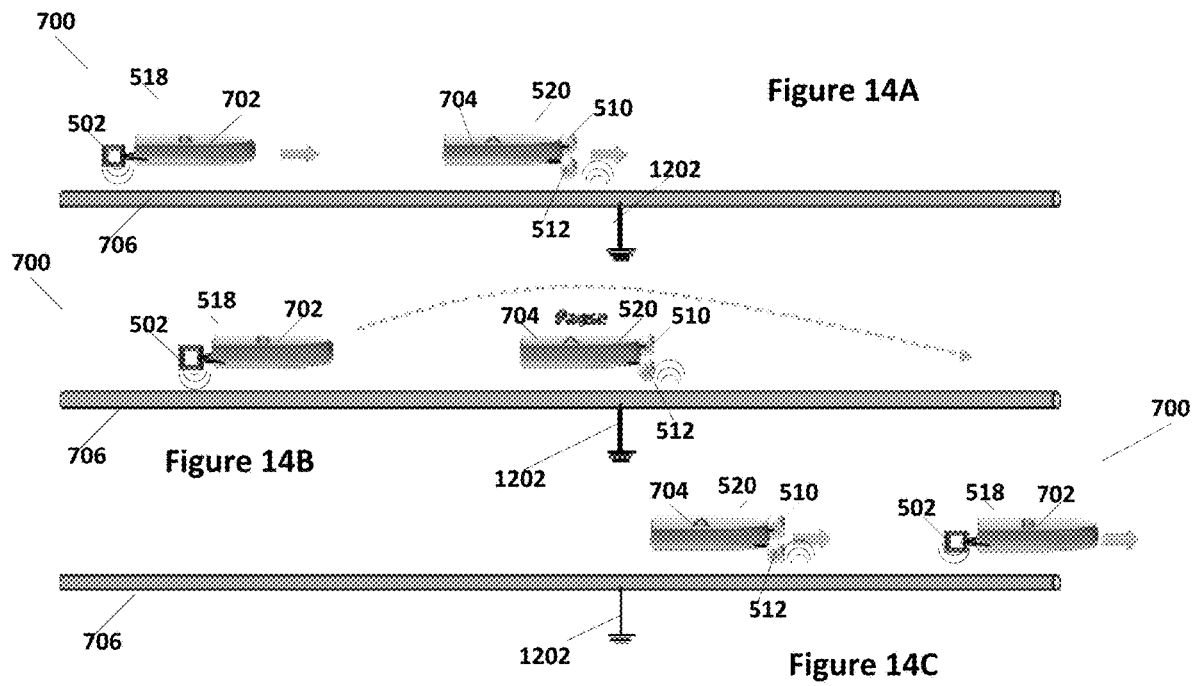
Figure 14A
Figure 14B
Figure 14C
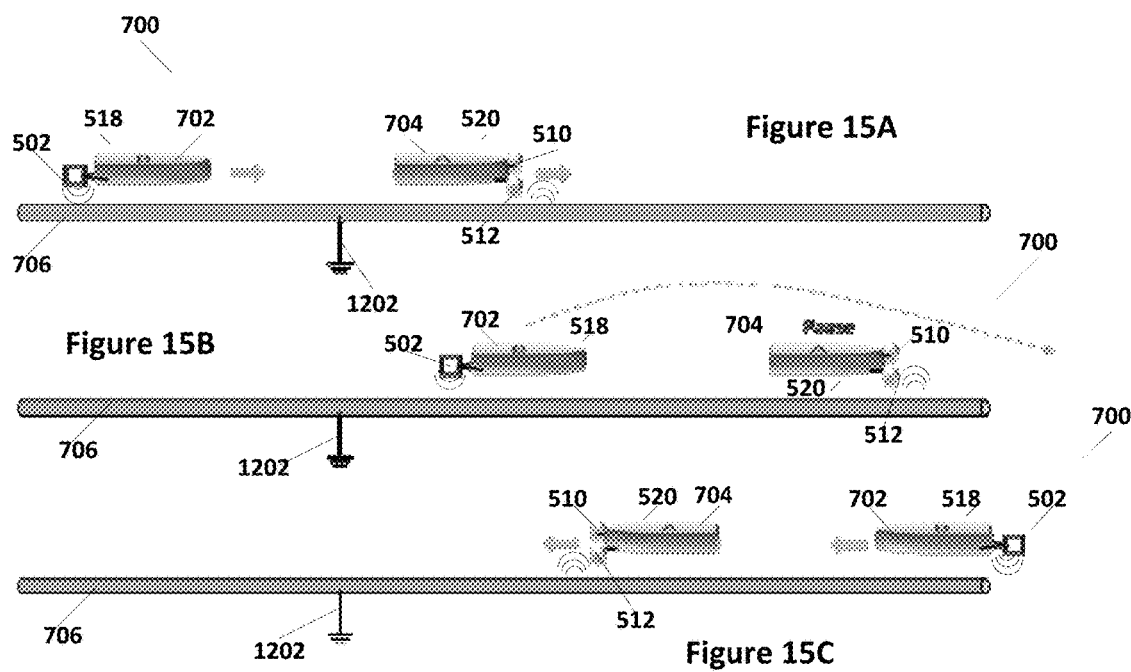
Figure 15A
Figure 15B
Figure 15C

METHOD AND APPARATUS FOR SIMULTANEOUS INDUCTIVE EXCITATION AND LOCATING OF UTILITIES

RELATED APPLICATIONS

The present disclosure is a continuation-in-part of U.S. patent application Ser. No. 15/616,704, filed on Jun. 7, 2017, which claims priority to U.S. Provisional Application 62/347,814, entitled "Method and Apparatus for Simultaneous Inductive Excitation and Location of Utilities, filed on Jun. 9, 2016, which is herein incorporated by reference in its entirety.

BACKGROUND

Technical Field

Embodiments of the present invention are directed towards utility location and, in particular, to the simultaneous inductive excitation and location of utilities.

Discussion of Related Art

The position of underground and underwater cable and pipeline utilities is routinely measured via the magnetic field induced when alternating current flows through the utility. This approach is used for various purposes, such as utility surveys, monitoring of depth of cover, construction and installation, dredging preparation, and fault locating. The alternating current may be injected into the utility through a direct electrical connection at an access point, may be injected through an inductive current clamp or an inductive antenna, or may be a part of the operation of the utility itself, as in the case of live power cables.

In some cases, the electrical properties of the utility may be such that current does not flow very far from the point of injection. Examples of this include utilities with strong capacitive or resistive coupling to ground and pipelines that are explicitly grounded at regular intervals for cathodic protection. In other cases, conditions may make it impractical or undesirable to inject current far from the measurement point. Examples of the former include underwater surveys that require an inductive antenna, but where both positioning and retrieval of the antenna are difficult. Increased calls for increased efficiency in covering long distances are examples of a case where positioning and retrieval of an inductive antenna is inefficient.

Solutions that currently exist for solving the problem where current is difficult to induce use pulse induction, such as that described in "Metal Detector Basics and Theory," Minelab.com; and "Laying pipes and cables and meeting the challenge of finding them again afterwards," MaritimeJournal.com, 2015. In these systems, a transmitter transmits an electromagnetic pulse in the direction of the utility, listens for a response, and analyzes the response to derive the utility position. However, these methods generally suffer from limited accuracy in cable and pipeline positioning applications due to distortion and other undesirable effects.

Therefore, there is a need for systems for better location of underground cables or pipelines.

SUMMARY

In accordance with aspects of the current invention, a location system is presented. A locating system according to some embodiments includes a first platform, the first platform including a transmitter capable of inducing a current in a line; a second platform, the second platform including a receiver capable of detecting the current in the line; and a processor coupled to the first platform and the second platform, the processor directing the first platform and the second platform to control their motion over the line and collecting location data of the line.

In accordance with some embodiments, a method of operating a locating system that comprises a first platform with a transmitter and a second platform with a receiver over a line, includes propelling the first platform over the line; propelling the second platform over the line such that the receiver detects presence of the line; and directing direction of propulsion of the first platform and the second platform according to the detected presence of the line.

These and other embodiments are further discussed below with respect to the following figures.

BRIEF DESCRIPTION OF THE DRAWINGS

FIGS. 14A, 14B, and 14C illustrate a method of transiting a ground site with the locating system illustrated in FIG. 7.

FIGS. 15A, 15B, 15C illustrate another method of transiting a ground site with the locating system illustrated in FIG. 7.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 2:
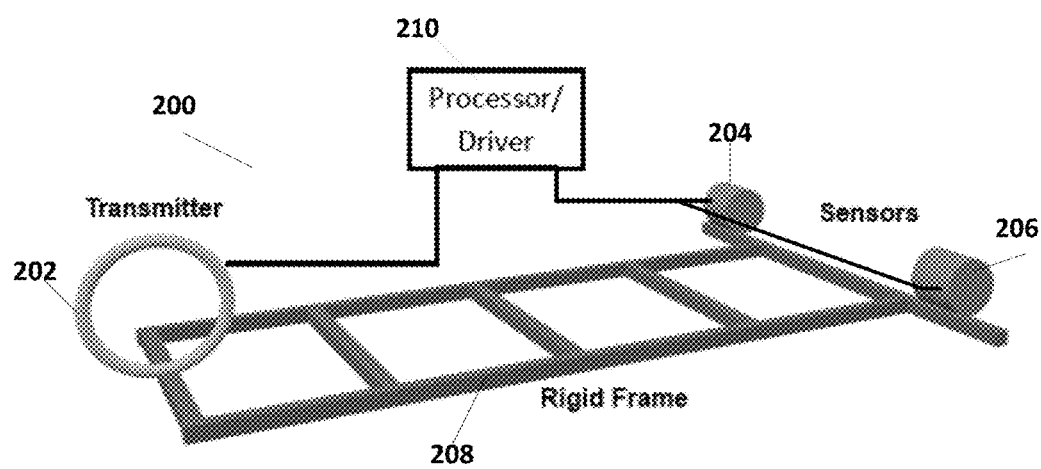
FIG. 2 illustrates an embodiment where the transmitter and sensor are mounted on a single rigid frame.
Figure 5:
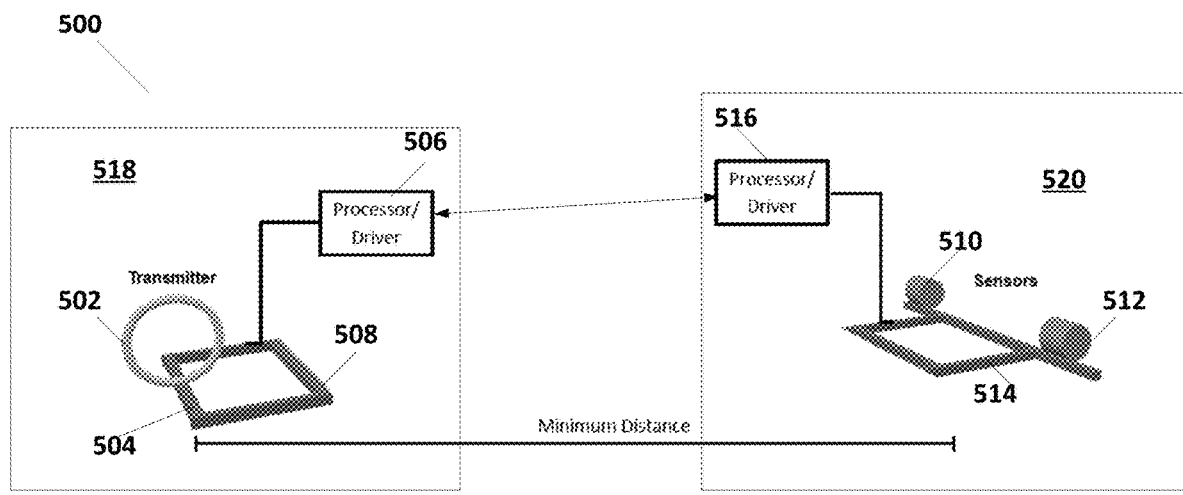
FIG. 5 illustrates an embodiment with separate platforms cooperatively to locate and track a target line.

FIGS. 2 and 5 illustrate some embodiments of the present invention. As illustrated in FIG. 2, system 200 includes sensors 204 and 206 as well as transmitter 202 mounted on a rigid frame 208. A processor/driver 210 can be coupled to control sensors 204 and 206 and transmitter 202 on rigid frame 208. Although two sensors 204 and 206 are illustrated in FIG. 2, system 200 may include any number of sensors. Furthermore, sensors may be oriented relative to one another in order to detect magnetic fields having particular directionality. For example, detectors 204 and 206 may be oriented in orthogonal directions.

As illustrated in FIG. 5, system 500 includes a transmitter 518 and a receiver 520. Transmitter 518 includes a transmitter 502 mounted on a frame 504. Transmitter 502 is driven by a processor/driver 506. Receiver 520 includes sensors 510 and 512 mounted on a second rigid frame 514. A processor/driver 516 is coupled to driver receivers 510 and 512. Processor/driver 506 can be in communication with processor/driver 516, either by physical connection or wirelessly. As is illustrated in FIG. 5, frame 508 with transmitter 502 can be kept a minimum distance from frame 514 with sensors 510 and 512. Again, sensor 520 can have any number of sensors, of which sensors 510 and 512 are illustrated. Furthermore, the sensors on sensor 520 can be oriented to detect magnetic fields in particular directions relative to one another. For example, sensors 510 and 512 may be orthogonally placed relative to each other.

As is illustrated in the embodiments of FIGS. 2 and 5, one direct approach to addressing the issues of locating utilities is to continuously induce current from the same or different platforms that carry the positioning system itself. For example, such platforms for underwater applications include remotely operated vehicles (ROV), underwater trenchers and autonomous underwater vehicles (AUV), and all-terrain vehicles (ATV) for underground applications. In accordance with some embodiments, therefore, the position of a conducting linear structure (a cable or pipeline) can be measured using a continuous-wave induction system with one or more transmitters and one or more sensors mounted on a single rigid frame or multiple rigid frames working in relation to one another The effects of direct coupling between transmitter 202 and sensors 204 and 206, or between transmitter 502 and sensors 510 and 512 in the embodiment of FIG. 5, can be modeled and subtracted from the actual set of measurements in order to derive the position of the structure from the residual fields. The direct coupling model can be based on physical laws for magnetic induction or be empirically based on measurements. In some embodiments, the phase of the direct coupling can be measured with the sensors and the phase aligned with the phase of other sensors, using the out-of-phase component of the result to derive the position.

Continuous-wave induction often offers improved positioning accuracy, but suffers from strong direct coupling between transmitter and receiver when the two are close to each other. This coupling distorts the field measured by the receiver and significantly affects accuracy if left unaddressed. Some embodiments of the present invention provide methods for the receiver to compensate for this direct coupling by extracting the magnetic field emanating from the utility from the total measured field.

As discussed above, FIG. 2 illustrates a sensing system 200 according to some embodiments of the present invention. As illustrated in FIG. 2, sensors 204 and 206 and transmitters 202 are mounted on a rigid frame 208. The rigid frame 208 provides for separation of the sensors 204 and 206 from transmitters 202 and also provides for certainty in the relative locations of transmitters 202 and sensors 204 and 206. As is illustrated in FIG. 2, a processor/driver 210 is coupled to the transmitters 202 and the sensors 204 and 206. The processor/driver 210 includes electronics for driving the transmitters 202 and receiving signals from the sensors 204 and 206. Further, the process/driver 210 includes data processing capability sufficient to process the data received as described below. In some embodiments, the processor/driver 210 may be incorporated on the rigid frame 208. In some embodiments, the process/driver 210 may be separated from the rigid frame 208 and electronically coupled to transmitters 202 and receivers 204 and 206 mounted on the frame 208.

Another direct approach to addressing the issues of locating utilities is to separate the inducing transmitter and the positioning system by sufficient distance so that any effects of direct coupling are negligible. In this approach, the transmitter can be kept close enough to the target line to induce a measurable level of continuous current while also remaining close enough to the positioning system so that said current does not significantly diminish before reaching the positioning system. Such a system is illustrated by system 500 of FIG. 5.

In most applications, the appropriate separation distance is larger than what can be practically supported by a single platform, requiring separate platforms for the transmitter and the positioning system. In some applications, the transmitter can remain stationary while the positioning system tracks the line position for some distance, but in other applications, the transmitter has to move continuously with the positioning system. As discussed above, system 500 includes transmitters 502 on a first platform 504 while sensors 510 and 512 are mounted on a second platform 514. Platforms 504 and 514 can be kept separated by a minimum distance while each is positioned to interact with a utility.

In some applications, the location of the underground utility is not known a priori, so suitable transmitter locations or paths can be determined dynamically based on the positioning results.

FIG. 5 illustrates a system 500 according to some embodiments where inductive transmitter 502 and a positioning system 520 with sensors 510 and 512 are mounted on separate platforms 504 and 514, respectively, each operated by processor/driver 506, 516, respectively. One of the processor/drivers 506 or 516 may also provide navigational guidance to one or both platforms 506 or 516 in order to simultaneously keep the transmitter 502 sufficiently close to the target utility for efficient induction and reduce the direct path coupling to an insignificant level.

Magnetic Induction

An inductive loop antenna generates a magnetic field that is proportional to the magnitude of the current flowing in the loop and the loop area, and which predominantly behaves like a magnetic dipole anywhere except close to the loop itself (See David C. Jiles, "Introduction to Magnetism and Magnetic Materials (2 ed.)", CRC 1998; I. S. Grant and W. R. Phillips, "Electromagnetism ($2^{nd}$ ed.)," Manchester Physics, John Wiley & Sons, 2008).

Accordingly, the magnetic field at a position in free space defined by a vector r relative to the antenna center can be described by the following equation:

$$H_D(r) = \frac{1}{4\pi}\left(\frac{3r(m \cdot r)}{\|r\|^5} - \frac{m}{\|r\|^3}\right) \quad \text{(Eq. 1)}$$

Here, the vector m is the magnetic moment of the antenna, with magnitude equal to the product of the loop current and the loop area and direction along the primary antenna axis, and $H_D$ is magnetic field in units of A/m.

Equivalent equations can be derived for the magnetic field in a conductive medium such as seawater, but those equations are not included in this description.

Since the methods described in this document are based on continuous-wave excitation at one or more distinct frequencies, it is convenient to view both m and $H_D$ as phasors, each described by a vector of three complex values that captures the amplitude and phase of the continuous-wave field along each coordinate axis. Each component of these vectors has the same phase, but a superposition of two or more such vectors may not, as will be shown later.

As described by Faraday's law of induction (David C. Jiles, "Introduction to Magnetism and Magnetic Materials (2 ed.)," CRC 1998), the time-varying magnetic field $H_D$ will induce an electromotive force ε in any closed circuit that is equal to the negative of the time rate of change of the magnetic flux enclosed by the circuit:

$$\varepsilon = -\mu_0 \frac{d}{dt} \int\!\!\int_A H_D(r, t) \cdot dA \quad \text{(Eq. 2)}$$

In (Eq. 2), dA is an incremental unit of area enclosed by the circuit, $\mu_0$ is the vacuum permeability, equal to $4\pi \times 10^{-7}$ Vs/(Am), and the integration is taken over the entire area enclosed by the circuit. The time-dependence of $H_D$ has been emphasized here for clarity.

Then considering that the target utility can be considered an infinitely long straight conductor and the primary antenna axis can be considered to be perpendicular to the conductor, the expression provided in (Eq. 2) may be simplified as:

$$\varepsilon = \frac{\mu_0 \omega \|m\|}{4\pi r} \quad \text{(Eq. 3)}$$

Here, $\omega = 2\pi f$, where f is the frequency of the excitation signal, and r is the shortest distance from the antenna center to the conductor. A straightforward modification can be made to factor in any rotation of the antenna with respect to the conductor.

If the closed circuit has total impedance Z, then the induced current in the target conductor is given by:

$$I_L = \frac{\varepsilon}{Z} = \frac{\mu_0 \omega \|m\|}{4\pi r Z} \quad \text{(Eq. 4)}$$

It should be noted that the impedance Z may include capacitive and inductive effects, so the phase of the current $I_L$ may be different from the phase of the magnetic field $H_D$.

Current will also be induced in other closed circuits present in the environment, including so-called eddy currents that are induced within metallic objects and other conductive materials that are in the vicinity of the transmitters.

The induced currents, including both $I_L$ and eddy currents, will in turn generate their own magnetic fields according to the Biot-Savart law. (See, e.g. David C. Jiles, "Introduction to Magnetism and Magnetic Materials 2ed.)," CRC 1998; I. S. Grant and W. R. Phillips, "Electromagnetism ($2^{nd}$ ed)," Manchester Physics, John Wiley & Sons, 2008. Consequently, a magnetic field sensor placed in the environment will measure the complex superposition of the magnetic fields emanating from these multiple sources, as well as the direct coupling from the transmitter.

The Biot-Savart law as applied to the target utility in free space is as indicated in (Eq. 5), where $I_L$ is the current on the utility, r is the measurement position vector, dx is a length element of the conductor and x is the position of that element on the conductor.

$$H_L(r) = \frac{I_L}{4\pi} \int_C \frac{dx \times (r - x)}{\|r - x\|^3} \quad \text{(Eq. 5)}$$

As before, $H_L$ is a time-varying quantity at one or more distinct frequencies and can be represented by a complex three-dimensional vector at each frequency, with each component describing the magnitude and phase of the magnetic field along a coordinate axis.

As before, equivalent equations can be derived for the magnetic field in a conductive medium such as seawater, but those equations are not included in this description.

Figure 4:
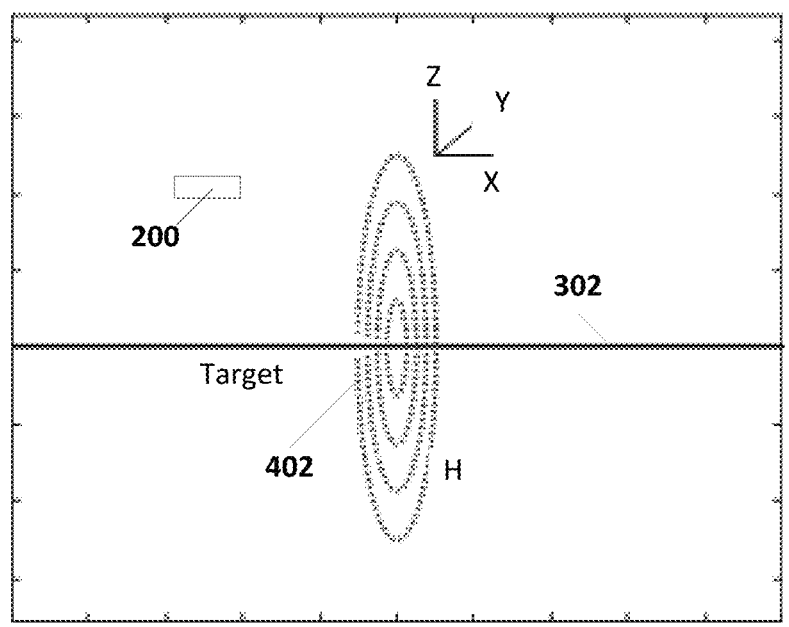
FIG. 4 illustrates the two-dimensional field lines and the sensor axes for location systems according to some embodiments.

(Eq. 5) can be simplified to a two-dimensional field that decays as the inverse of the distance r to the conductor, which may be represented in the conductor's coordinate system with the X-axis pointing along the conductor as shown in FIG. 4 and indicated in (Eq. 6).

$$H_L(r) = \frac{I_L}{4\pi} \begin{bmatrix} 0 \\ -z/r \\ y/r \end{bmatrix} \quad \text{(Eq. 6)}$$

Here, r is the shortest distance to the conductor and y and z may be chosen as the horizontal and vertical offsets from the conductor, respectively.

Performance

Embodiments of a receiver system can substantially distinguish between the magnetic field emanating from the utility from other effects, including the direct coupling, eddy-current effects and environmental noise. The effects of unstructured environmental noise may be partially removed by appropriately filtering the measured signals, but the other effects are highly structured and may be removed by other methods.

For accurate positioning of a target utility the undesirable effects can be reduced to well below the strength of the magnetic field emanating from the utility. In some embodiments, a level of reduction of 20 dB below the target field, or to 1/10th of its strength, may be sufficient. As described in the previous section the latter depends on the position and orientation of both the transmitter antenna and the receiver's sensors as well as the impedance of the utility. Therefore, positioning of the system with respect to the conductor becomes more difficult as distance between the combined system and the utility increases and as the impedance increases.

The impedance of cable or pipeline utilities varies significantly in practice. The internal resistance and ground capacitance of high-voltage power cables are typically on the order of 0.1-1 Ω/km and 0.1-1 μF/km, respectively (see, e.g. "Nexans Submarine Power Cables," Nexans, 2013), and their ground impedance can be expected to be a few Ω. At a typical induction frequency of a few kHz and for a cable a few km long this results in a few Ω total impedance. Large pipelines may have significantly lower impedance, especially if grounded at regular intervals through protective anodes or similar methods, while utilities with higher internal resistance or poor grounding may have higher total impedance.

When a single platform, such as system 200 illustrated in the embodiment of FIG. 2, is targeted for this use, its size also varies. As an example, a cable-laying trencher may be as long as 8 m, allowing for 10 m separation between antenna and sensors, while a work-class ROV only allows a 4 m separation. The former may also allow smaller separation between the inductive antenna and the cable.

Figure 1A:
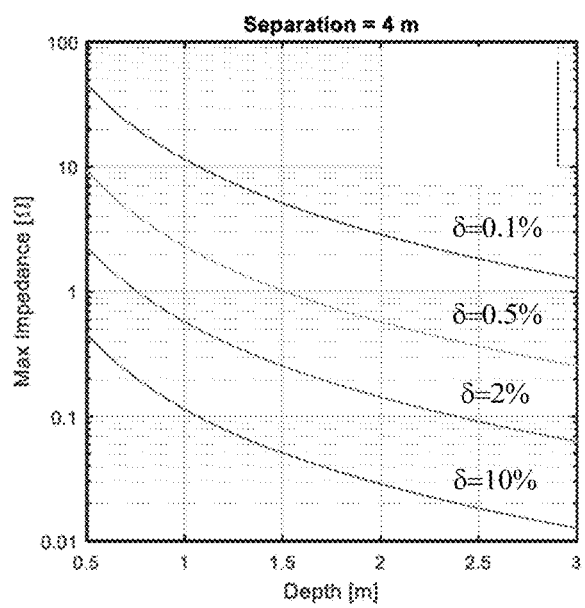
FIGS. 1A and 1B illustrate maximum target impedance for different compensation performance levels.
Figure 1B:
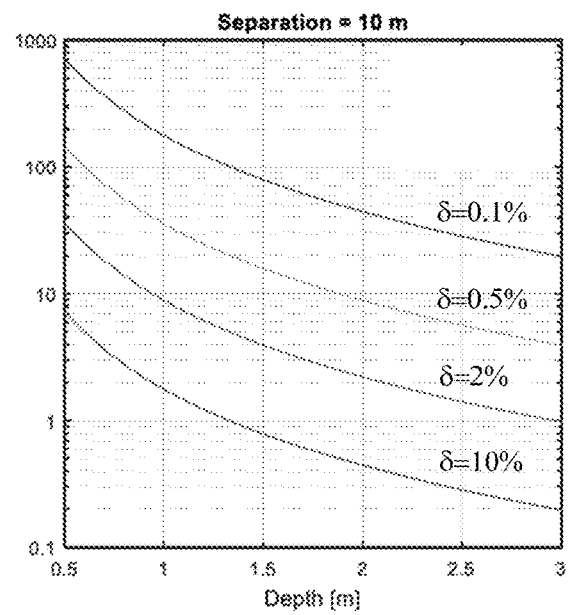

The graphs illustrated in FIG. 1 shows the maximum total impedance addressable with different performance levels at two different separation distances in order to maintain a 20 dB difference between the desired and undesired magnetic fields. The performance level is indicated by the parameter δ as a percentage of the full strength of the direct coupling between the transmit antenna and the receiver, with δ=10% indicating that 10% of the direct coupling remains, for example.

When separate platforms are used for the transmitter and the positioning system the minimum distance between the two that effectively eliminates the effects of direct coupling is typically on the order of 100 m, but this depends on both the strength of the antenna and the sensitivity of the sensors.

The rate of decay of the induced current depends on both the electrical properties of the target utility and the frequency of the inductive antenna. A fast decay may require that the two platforms be kept relatively close to each other, but slower decay may allow the separation distance to vary over a wider range.

Positioning Methods

This section outlines four methods for removing the undesirable effects of direct coupling and induced eddy currents, and three methods for deploying separated transmission and measurement. The first two are based on explicitly characterizing the distortion and then subtracting it from the aggregate measured signal, the next two rely on indirectly estimating the contribution of the target utility to the aggregate signal, and the last three focus on how a transmitter can be placed or moved while providing sufficient continuous current for the measurements to be used to locate or track a target cable or pipeline. It should be understood that a cable may be either composed of a single conductor or multiple conductors, such as bundled bipolar HVDC or bundled three-phase HVAC cables. One skilled in the art may recognize other methods from the ones described herein that may also be used for removing the undesirable effects or positioning a transmitter.

In the first four cases both transmitter and receiver are assumed to be mounted on one rigid frame and therefore are useful with system 200 as illustrated in FIG. 2. As discussed above, transmitter 202 and sensors 204 and 206 are typically at opposite ends of rigid frame 208 in order to maximize the separation between the two. Depending on the application, system 200 may utilize multiple transmitters, any number of sensors 204 and 206, and may operate at multiple signal frequencies. Nonlinear solution methods such as the Levenberg-Marquardt algorithm (R. Fletcher, "Practical Methods of Optimization," Wiley, 1987) or an iterative method such as a Kalman filter (Grewal and Andrews, "Kalman Filtering," $2^{nd}$ edition, Wiley, 2001) may then be applied to the resulting residual measurement to derive the position of the utility. This is described in more detail in U.S. Pat. No. 7,356,421 by T. Gudmundsson and J. Waite, "Precise Location of Buried Metallic Pipes and Cables in the Presence of Signal Distortion," which is herein incorporated by reference in its entirety.

In the latter three cases the direct coupling is ignored and the position of the utility is derived via more conventional methods, such as the ones described in U.S. Pat. No. 7,356,421.

These latter three methods all rely on finding a suitable initial location for the transmitter platform, whether it be the rigid frame 208 of FIG. 2 or platform 504 of transmitter 518, where the transmitter or transmitters are close enough to the target line to induce measurable current on it. There are multiple ways of accomplishing this depending on a priori knowledge of the line location, line conditions, available equipment and other factors.

In some embodiments, the platform may be placed near an accessible terminal, at landfall for a subsea cable, or at a section of the line that is visible.

In other embodiments, the transmitter platform 504 of transmitter 518 and the sensor platform 514 of sensor 520 may be used cooperatively to find a suitable location. If the orientation of the target line is known, cooperate use of transmitter 518 and 520 may be done by moving both platforms 504 and 514 simultaneously across the target line, noting when the largest measurement is obtained by the sensors and using that as the initial position for the transmitter platform. If the direction is not known the same procedure can be repeated at different angles until such a maximum is found.

Model-Based Estimation of Direct Coupling

When the primary cause for distortion is the direct coupling between the transmitter and receiver and other effects such as eddy-current induction are minimal, the direct coupling may be estimated directly from (Eq. 1) above or other equivalent equations. If the separation between the antenna and a sensor at position r is $r_D$, then the measured signal $H(r,r_D)$ is the sum of the direct coupling signal $H_D$ and the induced signal $H_L$ as indicated in (Eq. 7).

$$H(r,r_D) = H_L(r) + H_D(r_D) \tag{Eq. 7}$$

An estimate of $H_D$ can be obtained using (Eq. 1) and subtracted from the measurement to get an estimate of $H_L$.

Empirical Estimation of Direct Coupling

In some applications, it may be possible to move the entire system far enough away from the target utility to remove its effects in the measurements for a period of time. Measurements made during this period may then be used to compose an empirical model of the aggregate distortion, including amplitudes and signal phases for each sensor.

Let $H_A$ be the aggregate distortion signal. Then the measured signal can be described by (Eq. 8) below.

$$H(r,r_D) = H_L(r) + H_A(r_D) \quad \text{(Eq. 8)}$$

The empirical estimate of $H_A$ can be subtracted from the measured signal to obtain an estimate of $H_L$.

Differential Adjustment for Direct Coupling

In some cases, system 200 may be mounted on a single vehicle that is capable of navigating through turns and altitude changes, such as on an ROV, AUV or ATV. In those cases, a path can be chosen that continuously changes the relationship between the system and the target. The path may be predetermined or adjusted dynamically.

While the geometric relationship between the system and the target utility can be changed this way, the relationship between the transmitter antenna 202, the rigid platform 208, and the receiver sensors 204 and 206 does not change. Therefore, the distortion caused by direct coupling and eddy currents induced on the platform itself remains constant, at least for short periods of time, and subtracting measurements from two separate time instances and locations will largely cancel the effect. The remaining differential measurement can be used to derive the position of the target, for example by modeling the measured magnetic field as a function of both the sensor and antenna positions relative to the target, and solving for the latter.

Figure 3:
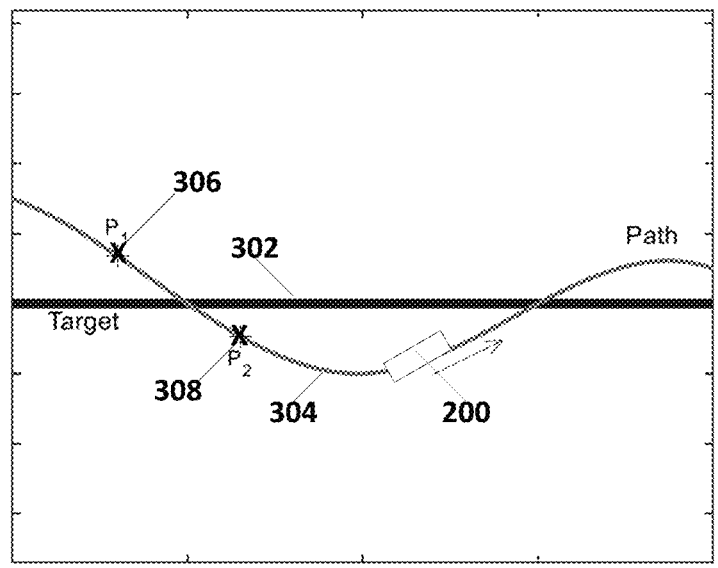
FIG. 3 illustrates an example travel path for changing the geometry between the target and sensors with the embodiment illustrated in FIG. 2.

FIG. 3 shows an example path 304 over a target utility 302 that can be used with system 200. The difference between measurements at points P1 306 and P2 308 illustrated in FIG. 3 can be used for positioning. For reference, FIG. 4 illustrates a coordinate system that can be used during calculations, with the X direction being along the target conductor and the Y and Z direction being orthogonal to the target conductor.

Let the two measurements at points P1 and P2 be as follows for each sensor in system 200, where $H_L$ is the magnetic field induced by the current in the target utility, $H_A$ is the aggregate of the direct coupling and any fields induced by eddy currents on the platform, $r_1$ and $r_2$ are the two measurement positions, $r_D$ is the position of the sensor relative to the antenna center, and $t_1$ and $t_2$ are the two measurement times, resulting in the measured magnetic fields $H_1$ and $H_2$ as described in (Eq. 9).

$$H_1(r_1,r_D,t_1) = H_L(r_1,t_1) + H_A(r_D,t_1)$$

$$H_2(r_2,r_D,t_2) = H_L(r_2,t_2) + H_A(r_D,t_2) \quad \text{(Eq. 9)}$$

The two $H_A$ terms will only differ in phase if the time difference between the measurements is small enough to avoid any significant time-varying effects. If the transmitter and receiver are synchronized, the phase difference may be removed by simply subtracting the two measurements, leaving dependence only on the desired signal from the target utility.

$$H_2(r_2,r_A,t_2) - H_1(r_1,r_A,t_1) = H_L(r_2,t_2) - H_L(r_1,t_1) \quad \text{(Eq. 10)}$$

If the transmitter and receiver are not synchronized the phase difference between the two measurement times can be tracked and used to correct one of the equations before the subtraction.

If the change in the platform's position and orientation between the two positions is known, either from the vehicle's navigation system or another independent positioning mechanism, the right-hand side can be modeled in terms of a single target position using (Eq. 4) and (Eq. 6).

Using Signal Phase to Cancel Direct Coupling

In some applications such as cable installation the orientation of the magnetic field sensors relative to the target cable may be easily controlled, allowing a sensor to be placed perpendicular to the cable. This sensor will measure only the distortion from direct coupling and induced eddy currents and can therefore be used as a phase reference for that aggregate signal.

(Eq. 9) and (Eq. 6) may be used to describe this in more detail. Let the sensor in question be placed so that it aligns with the X axis of (Eq. 6) so that it will only measure the contribution of the $H_A$ component of (Eq. 9). A measurement made by other sensors in the same location partially or fully aligned with the Y or Z axis of (Eq. 6) can be separated into two components, one phase-synchronous with X-axis measurement and the other 90° out of phase with it. If the phase of $H_L$ is substantially different than the phase of $H_A$ and the phase of $H_A$ is uniform for all directions, then this separation will result in an out-of-phase signal on the Y and Z sensors that only originates on the target utility and may be therefore be used for positioning.

As an example, FIG. 4 shows the 2-dimensional field 402 emanating from the cable 302 and three sensor axes. The X-axis is perpendicular to the field and can be used as a phase reference for the distortion signal while the out-of-phase components of the measurements made by sensors oriented along the Y and Z axes can be used for positioning.

In cases where the distortion signal includes multiple eddy-current sources in addition to the direct coupling the signal received by sensors in different locations may not be phase-synchronous. In those cases, the out-of-phase components from different sensor locations are not balanced in amplitude and cannot be combined directly in a positioning method. However, if the Y and Z components from each location are themselves balanced, then the ratio of the two components from (Eq. 6) may still be utilized for positioning along with knowledge of the separation between sensor locations.

Separated Platforms with Stationary Transmitters

If the electrical properties of the target utility line are such that the induced current can travel a substantial distance before decaying below an acceptable level, the transmitter platform 504 may be left in place while the sensor platform 514 is used to track the location of the line. The transmitter platform 504 can be moved to a new location periodically, for example when the measured signal level has decayed beyond an acceptable level.

A suitable initial location for the transmitter platform 504 may be found using one of the approaches described above. Subsequent locations can either be chosen in the same way or by using the line position measured by the sensor 520. The latter can be done either automatically based on the quality of that measurement, depth of burial, or other factors. Placement may also be accomplished manually by an operator.

Separated Platforms with a Predetermined Transmitter Path

If the electrical properties of the target utility line do not allow the induced current to travel very far, the transmitter 518 and sensor 520 may need to stay close to each other at all times, in some embodiments even as close as the minimum separation distance allows. In this case, both platforms 504 and 514 move in tandem, with the transmitter 518 either leading or following the sensor 520 within a range of separation distances.

If the horizontal position of the line is well known and if the platforms can be guided properly, this may be done by having the transmitter 518 follow a predetermined path, for example defined by a sequence of waypoints. Communication between the transmitter 518 and receiver 520 or between the transmitter 518, receiver 520 and a central controller may be necessary to moderate and control the speed of one or both.

Separated Platforms with a Dynamically Adjusted Transmitter Path

If the location of both platforms is known sufficiently well the measurements done by the positioning system on the sensor platform may be used to dynamically guide the transmitter platform, where the latter follows the former within a range of separation distances.

In some embodiments, the positioning system 500 continuously measures both the horizontal position and the depth of the target line and guides the transmitter 518 so that it follows at a set distance while remaining directly above the line and as low as possible.

Figure 6:
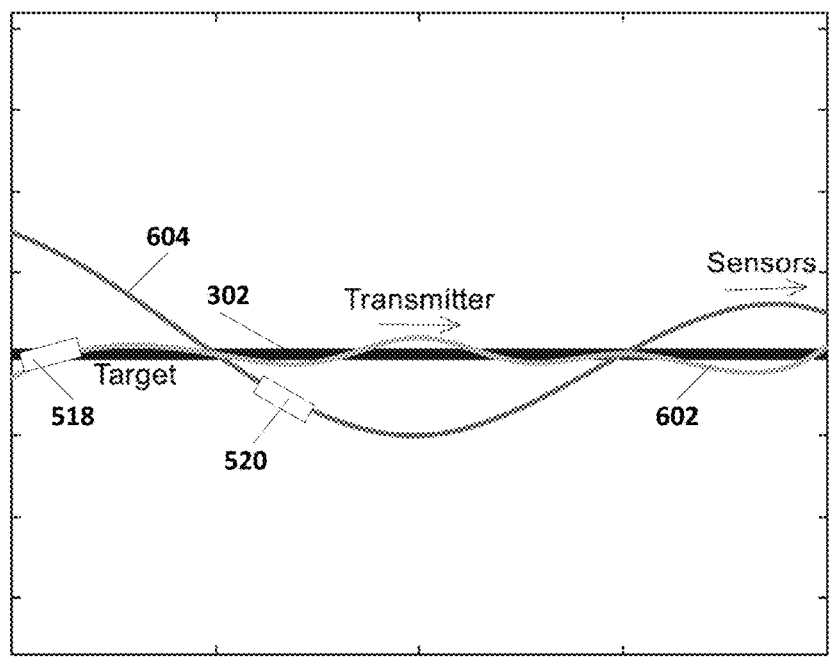
FIG. 6 illustrates an example of a transmitter platform and a sensor platform cooperatively tracing a line position.

FIG. 6 illustrates an example of this method, where the measurement area is viewed from above and the target utility line is shown as a thick blue line. The sensor platform 520 traces a line 604 while tracking the signal induced by transmitter on platform 518. System 500 uses the measurement of the line position to guide transmitter 518 along a line close to target line 302, resulting in the path 602 illustrated in FIG. 6. The transmitter 518 follows the sensor 520 at a distance that is large enough so that effects of direct path coupling are not significant but close enough that current induced in target 302 is detectable by receiver 520.

Tracking of Underwater or Underground Pipelines or Cables

In some embodiments, pipelines can be located. In some cases, coupling of radiation into the target pipeline can be inefficient because of bleed-off over long distance or because of grounding through cathodic protection anodes, coating defects, or by other methods. Tracking methods that use a continuous-wave alternating current inductive transmitter are described in patent application 20150226559, but in some cases, the accuracy of such methods is limited by either direct magnetic coupling from the transmitter to the sensors used by the tracking system or by bleed-off over long distances or through grounding, especially on subsea pipelines. Methods for acquiring and tracking power lines is described in U.S. Pat. No. 9,285,222, some of which are similar to what is described in this document. However, those methods do not address pipeline tracking, particularly when pipelines are equipped with anodes for cathodic protection or are subject to leakage because of coating defects.

In some embodiments, methods by which multiple platforms can cooperate, some carrying inductive transmitters and others carrying sensors, may be an efficient way to locate pipelines or cables, for example. In some embodiments, one transmitter platform and one sensor platform can be used. However, more than one transmitter platform and/or more than one sensor platform may be used in some embodiments.

Figure 7:
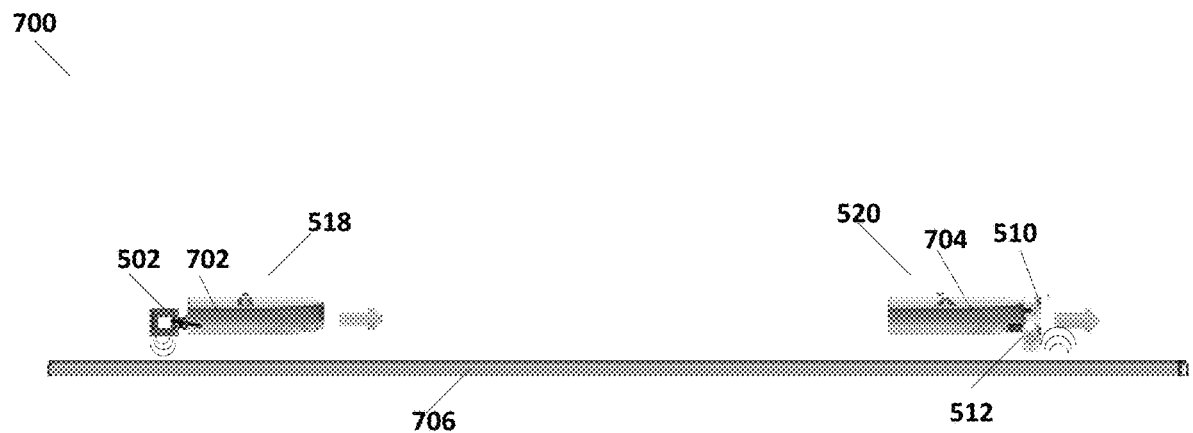
FIG. 7 illustrates a location system according to some embodiments of the present invention.

FIG. 7 illustrates an example embodiment of a system 700 according to the present invention. As is illustrated in FIG. 7, system 700 includes platforms 702 and 704. A sensor 520 is mounted on a platform 704 while transmitter 518 is mounted on a platform 702. As is illustrated, platform 704 includes one or more magnetic field sensors (sensors 510 and 512 are illustrated) while platform 702 includes one or more inductive transmitters, where transmit coil 502 is illustrated. In some embodiments, transmitter 518 may provide a continuous wave transmission to induce a current in pipeline 706. In some embodiments, transmitter 518 may provide a pulsed wave transmission to induce a current in pipeline 706.

As further illustrated in FIG. 7, platform 704 travels ahead of platform 702, tracking the position and depth of pipeline 706 via the induced current. The positions obtained from this tracking are used to guide platform 702 so that it can remain close to pipeline 706 and thereby induce current efficiently. In this description, although pipeline 706 is being used as an example, it should be understood that these embodiments can also operate to locate a cable.

Figure 8A:
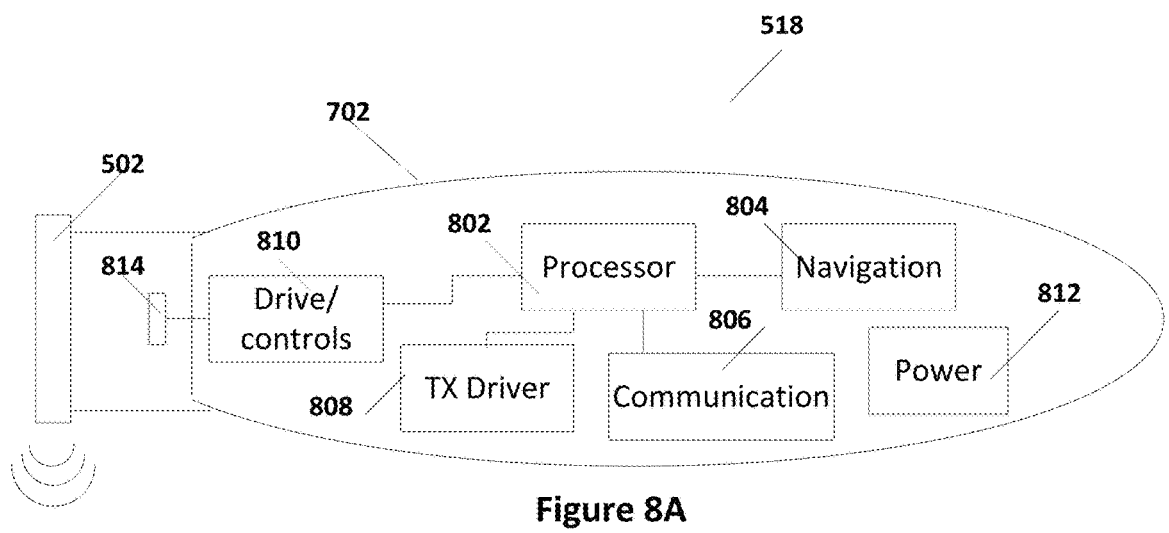
FIGS. 8A and 8B illustrate platforms that are included in the system illustrated in FIG. 7.
Figure 8B:
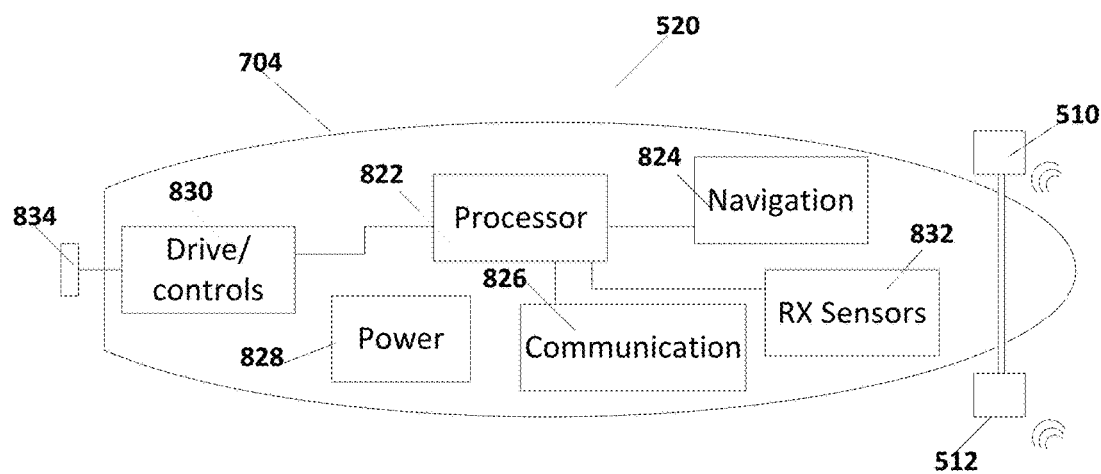

FIGS. 8A and 8B illustrate examples of platform 702 and platform 704, respectively. As is illustrated in FIG. 8A, transmitter coil 502 is mounted on a platform 702. Platform 702 includes a processor 802 that controls both the propulsion and platform 702 and transmitter 502. As such, processor 802 can be any processing unit capable of executing instructions for controlling the motion of platform 702, communicating with platform 704, and controlling the transmitter. Processor 802 can include one or more microprocessors coupled to sufficient volatile and non-volatile memory to hold data and instructions for controlling motion, controlling the output of transmit coil 502, and logging data regarding position and generated field strengths.

As is illustrated in FIG. 8A, processor 802 can be coupled to a navigation unit 804. Navigation unit 804 may include GPS locators and inertial navigation systems for determining the position and orientation of platform 702. Further, processor 802 is coupled to drive unit 810, which controls the propulsion and steerage of platform 702. For example, propulsion 814 for underwater applications may include any marine drive (e.g., one or more propellers, one or more jet drives) as well as any control surfaces (e.g., one or more rudders, one or more planer surfaces, or directional controls on the marine drive) to control pitch, roll, yaw, speed, and direction of travel. Platform 702 can also be encapsulated within a waterproof hull that is shaped to provide smooth motion through water. Further, propulsion 814 may include buoyancy controls to help control the depth of platform 702.

Processor 802 is further coupled to TX driver 808 that drives transmit coil 502, which is mounted on platform 702. Although transmit coil 502 is illustrated in FIG. 8A as being mounted from the stern of platform 702, transmit coil 502 can be mounted anywhere on platform 702 where it is capable of inducing current in a pipeline 706 as illustrated in FIG. 7.

Processor 802 is further coupled to communication 806, which allows for communications with platform 704. In some embodiments, communication 806 may further be in communications with operators on the surface so that both platform 702 and platform 704 can be controlled externally. In some embodiments, processor 802 receives instructions from platform 704 regarding its motion so that platform 702 can be guided by platform 704.

FIG. 8B illustrates an example of platform 704, which includes receiver 520. As is illustrated in FIG. 8B, sensors 510 and 512 are mounted on platform 704. Similar to platform 702, platform 704 includes a processor 822 that controls both the propulsion of platform 702 and the receiving functions of platform 702. As such, processor 822 can be any processing unit capable of executing instructions for controlling the motion of platform 704, communicating with platform 702 and other entities, and processing data from receive sensors 510 and 512. Processor 822 can include one or more microprocessors coupled to sufficient volatile and non-volatile memory to hold data and instructions for controlling motion, controlling the receiver functions, and logging data regarding the position of platform 704 and the location of pipeline 706.

As is illustrated in FIG. 8B, processor 822 can be coupled to a navigation unit 824. Navigation unit 824 may include GPS locators and inertial navigation systems for determining the position and orientation of platform 704. Further, processor 822 is coupled to drive unit 830, which controls the propulsion and steerage of platform 704. Drive unit 830 controls propulsion 834, which, for underwater applications, may include any marine drive (e.g., one or more propellers, one or more jet drives) as well as any control surfaces (e.g., one or more rudders, one or more planer surfaces, or directional controls on the marine drive) to control pitch, roll, yaw, speed, and overall direction of travel. Platform 704 can also be encapsulated within a waterproof hull that is shaped to provide smooth motion through water. Further, propulsion 834 may include buoyancy controls to help control the depth of platform 704.

Processor 822 is further coupled to RX sensors 832 that receives data from sensors 510 and 512 mounted on platform 704. Although sensors 510 and 512 is illustrated in FIG. 8B as being mounted extending from the bow of platform 704, sensors 510 and 512 can be mounted anywhere on platform 704 where the electromagnetic field from pipeline 706 can be detected. Further, processor 822 is configured to, from the data received from sensors 510 and 512, determine the location of pipeline 706 relative to platform 704 and the direction in which both platform 704 and platform 702 should travel to maintain contact with pipeline 706 and map out the location of pipeline 706.

Processor 822 is further coupled to communication 826, which allows for communications with platform 702. In some embodiments, communication 826 may further be in communications with operators on the surface so that both platform 702 and platform 704 can be controlled externally. In some embodiments, processor 822 provides instructions to platform 702 to guide platform 702 over pipeline 706.

Platforms 702 and 704 are powered by power units 812 and 828, respectively. Although other power systems may be used, in some embodiments power units 812 and 828 are battery systems that can be charged prior to use.

As illustrated in FIG. 7, platform 702 can receive direction based on detected data from platform 704. In some embodiments, platform 702 can further communicate its location, speed, direction of travel, and orientation to a controlling entity. Platform 704 may also communicate its location, speed, direction of travel, and orientation.

Figure 9:
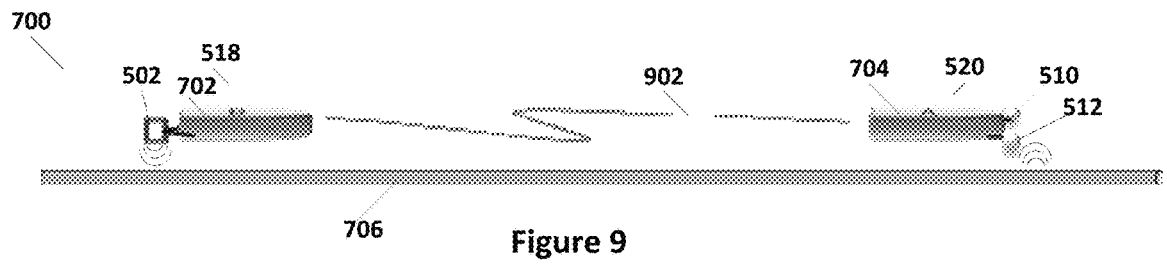
FIG. 9 illustrates a communication system that can be used in a location system as illustrated in FIG. 7.

As is illustrated in FIG. 9, platform 702 and platform 704 communicate between a data link 902. Data link 902 can be, for example, a physical tether (i.e., a cable connecting platform 702 and platform 704). Alternatively, any method of transferring data between platform 702 and platform 704 can be used. In such an example, platform 702 and platform 704 can cooperate to coordinate the operation of locating pipeline 706 and storing the data regarding that location.

Figure 10A:
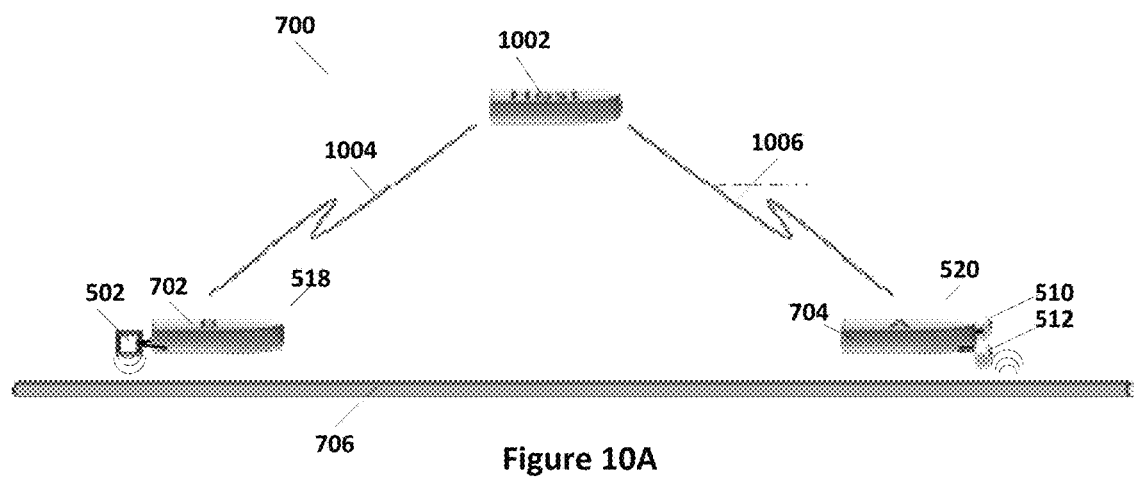
FIGS. 10A and 10B illustrate another communication system that can be used in a location system as illustrated in FIG. 7.

Alternatively, as is illustrated in FIG. 10A, platform 702 and platform 704 can each communicate with a host 1002. Again, data link 1004 between host 1002 and platform 702 as well as data link 1006 between host 1002 and platform 704 can be a physical tether or any other data link that allows for communications of data. In some embodiments, host 1002 may receive sensor data from platform 704 and provide navigational instructions to both platform 702 and platform 704 to locate pipeline 706.

Figure 10B:
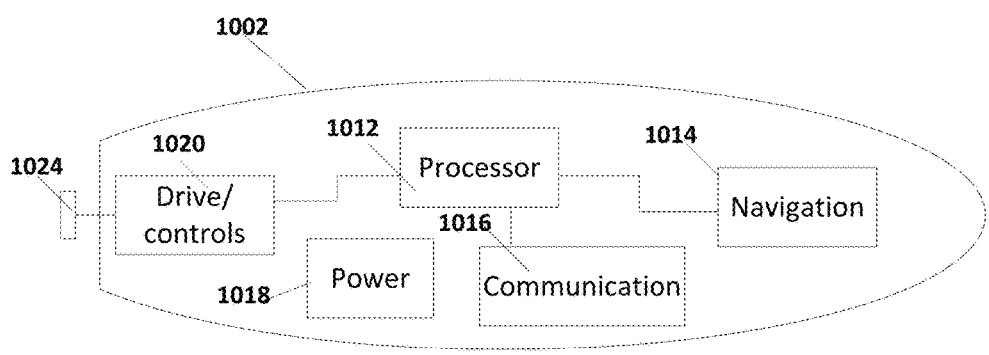

FIG. 10B illustrates an example embodiment of a host 1002. Host 1002 can be similar to platform 702 and platform 704 as illustrated in FIGS. 8A and 8B. As such, host 1002 can include a processor 1012, which as discussed above can include one or more microcontrollers combined with sufficient volatile and non-volatile memory to analyze data and provide navigational instructions to platform 702 and platform 704. Processor 1012 can be coupled to a navigation unit 1014, which may be a GPS unit and/or inertial navigation. Further, processor 1012 is coupled to drive 1020 that controls propulsion and steerage unit 1024, as described with FIGS. 8A and 8B. Host 1002 is powered by a power unit 1018.

Processor 1012 is further coupled with communication 1016, which allows for communication with both platform 702 and platform 704. In some embodiments, host 1002 may receive sensor data from platform 704 and determine the location of pipeline 706. Further, host 1002 may determine which direction platform 704 and platform 702 should move to continuously track pipeline 706 and provide instructions to platform 702 and platform 704 accordingly.

Figure 11:
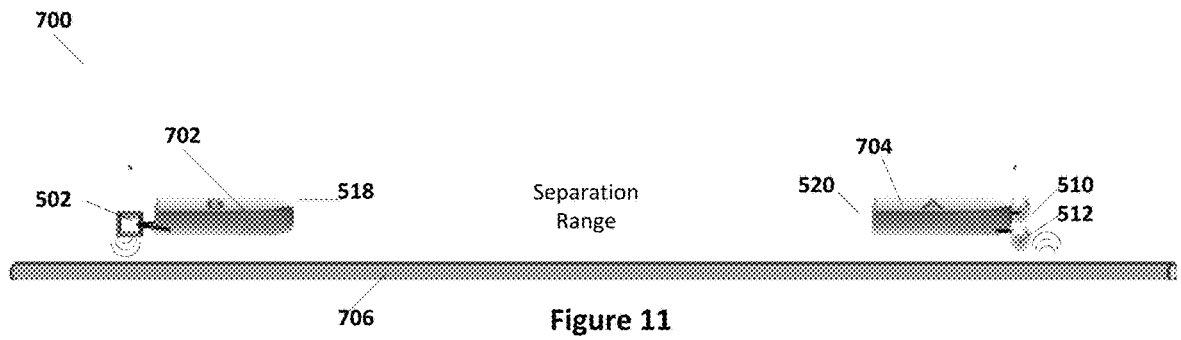
FIG. 11 illustrates separation between platforms in a locating system as illustrated in FIG. 7.

Whether platform 702 and platform 704 are in direct communication, or whether they communicate through host 1002, a separation distance between platform 702 and platform 704 can be maintained within a certain range to be effective, as is illustrated in FIG. 11. A minimum distance can be set so that the direct coupling from the transmitter 518 to the sensors 520 is insignificant, and the maximum distance can be set so that the current induced in pipeline 706 by the transmitter 518 will not bleed off significantly over the distance between platform 702 and platform 704.

The separation range between platform 702, which includes transmitter 518, and platform 704, which includes receive sensors 520, may not be fixed and can be balanced against the overall tracking performance as needed. For example, platform 702 and platform 704 may move closer together to reduce bleed-off, but compensate for stronger direct coupling by slowing down and moving closer to the target pipeline 706. Alternatively, platform 702 and platform 704 may move faster to increase the tracking efficiency, but compensate by moving further apart in order to reduce the direct coupling between transmitter 518 and receiver system 520.

Bleed-off is primarily caused by capacitive or inductive coupling of the target pipeline 706 to seawater, which gradually reduces the current as the distance to an injection point increases. In addition, many pipelines may have ground sites 1202, for example where they are equipped with cathodic-protection anodes, such as that shown in FIG. 12. Cathodic protection anodes on a pipeline which effectively grounds pipeline 706 at discrete points. Grounding the line, such as at ground sites 1202, leave little or no current at the side of the anode opposite to the injection point to be detected by receive sensors 520 in platform 704. Groundings at ground sites 1202 may also occur through defects or deterioration in a pipeline coating that provides contact between the pipeline and the surrounding soil or seawater. In between such grounding locations such as ground sites 1202, or when pipeline 706 is not grounded, sufficient current should flow for a few hundred meters or more, depending on the electrical characteristics of the target 706 and its coupling to soil or seawater. Consequently, platform 702 can be operated so that it remains within the separation range. In other words, platform 702 is at least the minimum distance separation from platform 704 that will substantially reduce or eliminate the effects of direct coupling while platform 702 is separated from platform 704 by less than the maximum distance of the separation range to provide for reliable tracking, as is illustrated in FIG. 11.

Figure 12:
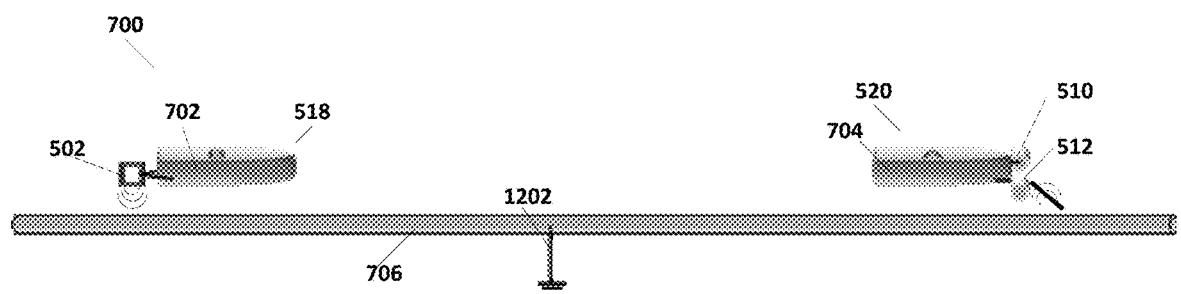
FIG. 12 illustrates an ground site in a pipeline to be located in a locating system as illustrated in FIG. 7.

However, when passing ground site 1202, as is illustrated in FIG. 12, most or all of the current induced on one side will generally bleed off before reaching the other side. This will largely make tracking impossible when platform 702 is on one side of ground site 1202 while platform 704 is on the opposite sides of ground site 1202. As is illustrated in FIG. 12, very little field may be detected by platform 704 because the field induced in pipeline 706 by platform 702 has been grounded at ground site 1202. Subsequently, a segment of pipeline 706 will be left without measurements between the time platform 704 passes ground site 1202 and when platform 702 passes ground site 1202, not only causing the pipeline position and depth to be unavailable, but also forcing platform 704 to fly unguided over that segment. Cathodic-protection anodes, which may form ground sites 1202, are typically separated by 100-300 m, so this can leave significant portions of the pipeline 706 unobserved, especially when the minimum separation distance of the separation range between platform 702 and platform 704 is large.

In a cable system, the same effect as ground site 1202 in pipeline 706 can occur if the cable is broken, damaged, or shorted to ground. As such, signals induced in the cable may not transmit, or the transmission is substantially curtailed, across the damaged portion of the cable. In this case, platform 702 and platform 704 can be operated around damage in a cable, or a break in pipeline 706, similarly to that described below with respect to ground site 1202.

Figure 13A:
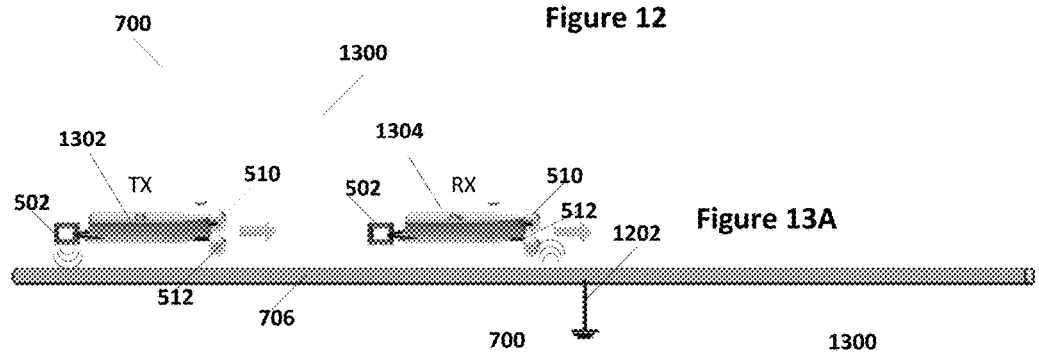
FIGS. 13A and 13B illustrate an embodiment of locating system that can transit an ground site in the target pipeline.
Figure 13B:
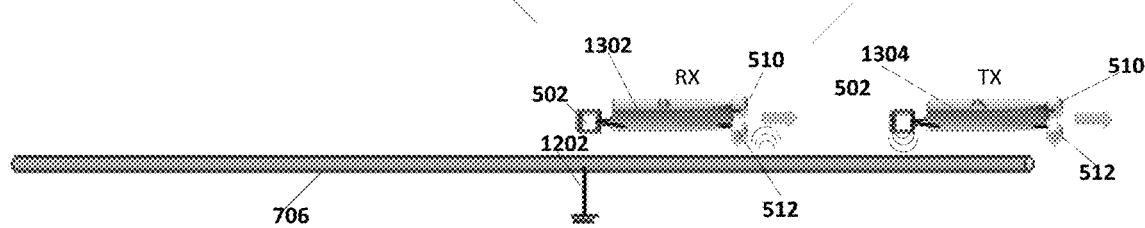

FIGS. 13A and 13B illustrate one approach to the lack of measurements after each ground site 1202 crossing can be handled in various ways. As is illustrated in FIG. 13A, a location system 1300 includes platform 1302 and platform 1304, each of which can function as a transmitter and a receiver. In other words, both platform 1302 and platform 1304 are provided with a transmitter 518 and a receiver 520. Platform 1310, which can be either one of platform 1302 or platform 1304, is illustrated in FIG. 13C.

Figure 13C:
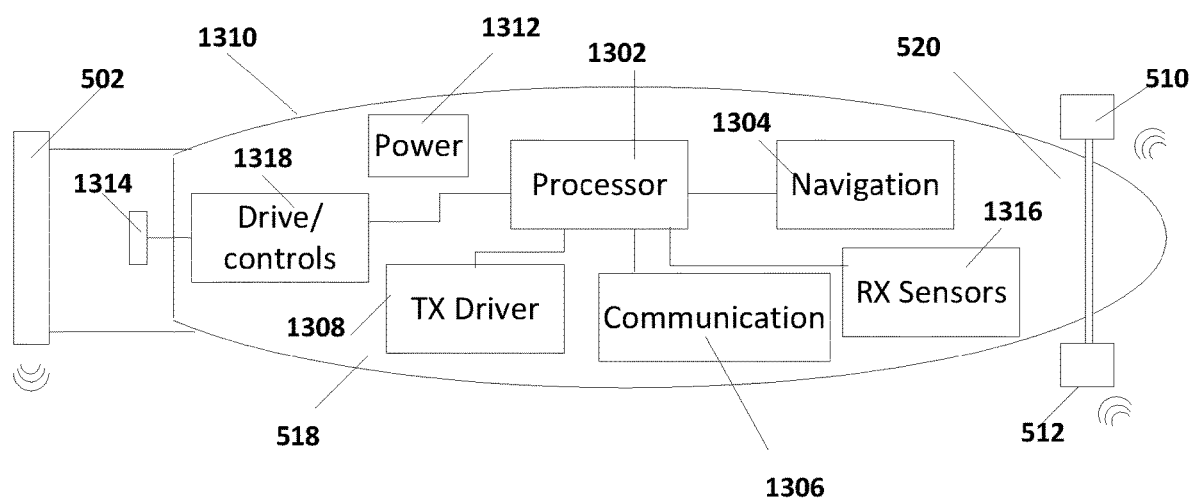
FIG. 13C illustrates an example of a platform that can be used in the method illustrated in FIGS. 13A and 13B.

As is illustrated in FIG. 13C, platform 1310 includes a transmit platform 518 as well as a receive platform 510. Further, platform 1310 includes a processor 1302 as described above with platforms 704 and 706. As discussed above, processor 1302 is coupled to a navigation platform 1304 and a propulsion drive control 1318 to control the location and the motion of platform 1310 by driving propulsion 1314. Further, platform 1310 is coupled to a communication system 1306 that communicates with another platform 1310 so that mapping of pipeline 706 is accomplished with a system that includes two platforms 1310. Furthermore, processor 1302 is coupled to RX sensors 1316, which receives data from sensors 510 and 512, as well as TX driver 1308, which drives transmit coil 502. Platform 1310 further includes a power source 1312.

System 1300 as illustrated in FIGS. 13A and 3B includes a pair of platforms 1310, platform 1302 and platform 1304. As described with respect to FIG. 13C, platform 1304 is equipped with both a transmitter and a receiver and platform 1302 is also equipped with both a transmitter and a receiver. In some embodiments, transmit platform 518 of platform 1302 is configured to operate at a different frequency than transmit platform 518 of platform 1304. Receiver 520 of platform 1302 is configured to detect radiation at the frequency generated by transmit platform 518 of platform 1304 and receiver 520 of platform 1304 is configured to detect radiation at the frequency generated by transmit system 518 of platform 1302. Consequently, both platform 1302 and platform 1304 can both transmit and receive simultaneously, allowing both to track pipeline 706 simultaneously.

Consequently, both platform 1302 and platform 1304 can collect tracking data until ground site 1202 is reached, at which point platform 1304 is unable to collect tracking data. As soon as platform 1304 passes ground site 1202, platform 1302 is unable to collect tracking data until it passes ground site 1202, at which point it begins to collect tracking data again when sensors 510 and 512 are beyond ground site 1202. Platform 1304 will again be able to collect tracking data when transmitter coil 502 of platform 1302 passes ground site 1202 and again induces current in pipeline 706 on the same side of ground site 1202 as is platform 1304. This allows platform 1302 to collect tracking data as soon as it passes the ground site 1202, since now that side of ground site 1202 is excited by transmitter coil 502 of platform 1304, as is illustrated in FIGS. 13A and 13B. In some systems, one of platform 1302 and platform 1304 leads and provides instructions for the other of platform 1302 and platform 1304 in order to track the length of pipeline 706.

Alternatively, instead of operating transmitters and receivers continuously in both platform 1302 and platform 1304, platform 1302 and platform 1304 can be switched between a TX mode and a RX mode as the pair transit over ground site 1202. As shown in FIG. 13A, platform 1302 can be in TX mode to induce current in pipeline 706 and platform 1304 can be in RX mode to detect radiation from pipeline 706 until detectors 510 and 512 pass ground site 1202. When ground site 1202 is detected, for example due to reduced radiation from pipeline 706, platform 1302 can be switched to RX mode and platform 1304 can be switched to TX mode. As such, platform 1304 collects tracking data on pipeline 706 up to ground site 1202 and platform 1302 collects tracking data on pipeline 706 after ground site 1202. In some embodiments, whichever of platform 1302 and 1304 is tracking data can act as lead, providing instructions to whichever of platform 1302 and platform 1304 is in TX mode. If another ground site 1202 is reached, platform 1302 and platform 1304 will each switch modes again as it is detected.

A similar result can be achieved without platforms with both transmitters and receivers as is illustrated in FIGS. 13A through 13C. FIGS. 14A through 14C illustrate operation with system 700 having platform 702 and platform 704 in the process of passing by ground site 1202. Platform 702 and platform 704 are discussed above and illustrated in FIGS. 8A and 8B.

As shown in FIG. 14A, platform 702 and platform 704 operate as discussed above until sensor 510 and 512 of platform 704 reach ground site 1202. As illustrated in FIG. 14B, when platform 704 detects ground site 1202, platform 704 comes to a stop and pauses over ground site 1202. At this point, platform 702 can bypass platform 704 and positions itself with the separation range ahead of platform 704. As illustrated in FIG. 14C, platform 704 and platform 702 can then proceed to collect tracking data with platform 704 being behind platform 702 in the process. In some embodiments, this configuration will continue until there is enough room behind platform 704 for platform 702 to take station within the separation range. At which point, platform 702 can reposition itself behind platform 704 so that the pair can proceed as is illustrated in FIG. 14A.

In some embodiments, as shown in FIGS. 15A, 15B, and 15C, the survey direction can be reversed once platform 704 has surveyed enough distance (for example twice the minimum separation distance) after passing ground site 1202 to instruct platform 702 where to start. As shown in FIGS. 15A and 15B, platform 702 bypasses platform 704 when ground site 1202 is passed. When enough distance has been placed between platform 704 and ground site 1202, platform 702 and platform 704 reverse direction of travel as is illustrated in FIG. 15C. Platform 704 then retraces its steps while platform 702 flies to the starting position identified by platform 702, both continue in the reverse direction until platform 704 passes ground site 1202 again, and then both return to their normal configuration, with platform 704 traveling along its original direction and platform 702 trailing behind as directed by platform 704, to continue collecting tracking data of pipeline 706.

The lack of guidance after platform 704 passes ground site 1202 is not easily handled. The measurement range of system 700 is expected to be large enough to allow some deviation, for example at least 1-2 m, from the path of pipeline 706, so simple dead-reckoning may suffice in most cases. However, platform 704 may still lose contact with the pipeline in extreme cases, at which time platform 704 must reacquire the pipeline 706.

Acquisition of Target Pipeline or Cable

Figure 16:
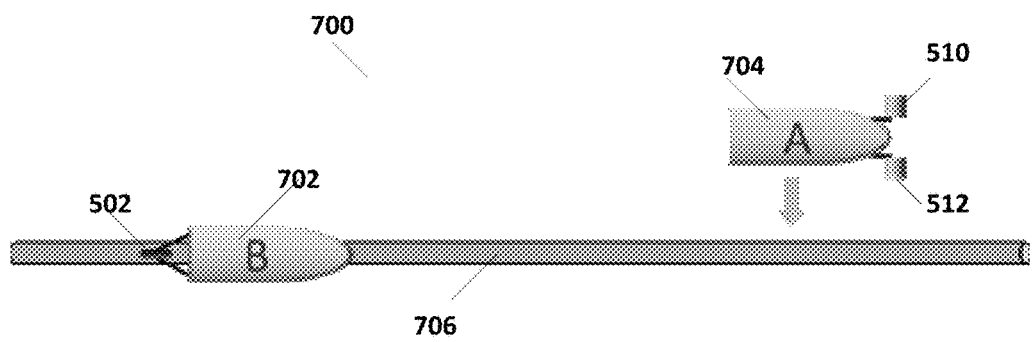
FIG. 16 illustrates a method of locating a pipeline with the locating system illustrated in FIG. 7.

The combination of platform 702 and platform 704 needs to find pipeline 706, both at the start of a survey and when contact with the target pipeline 706 has been lost during the survey. If any position of pipeline 706 is known, this can be used as a starting position for platform 702, which carries the transmitter. Positioning platform 702 over pipeline 706 will induce current on pipeline 706, allowing platform 704 to then sweep horizontally across pipeline 706 until a strong signal is detected, as is illustrated in FIG. 16. During this process, the separation distance between platform 702 and 704 may in some cases be below the minimum since platform 704 only needs to detect a change in signal strength in order to position itself about pipeline 706. Once positioned, the separation between platform 702 and platform 704 may be adjusted to fall within the separation range.

Figure 17A:
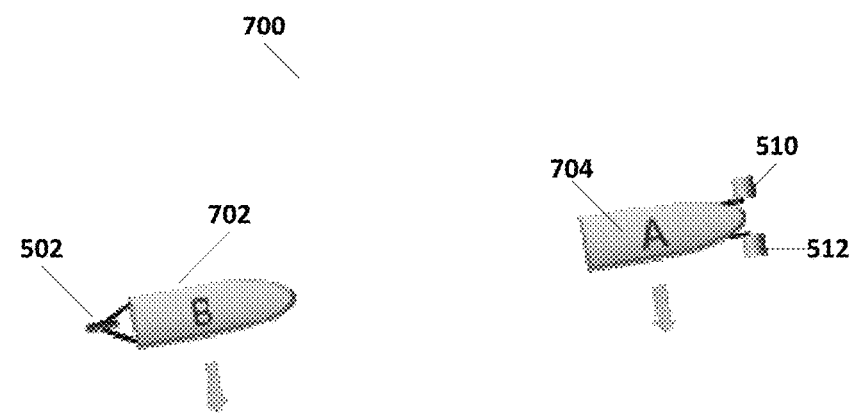
FIGS. 17A and 17B illustrate another method of locating a pipeline with the locating system illustrated in FIG. 7.
Figure 17B:
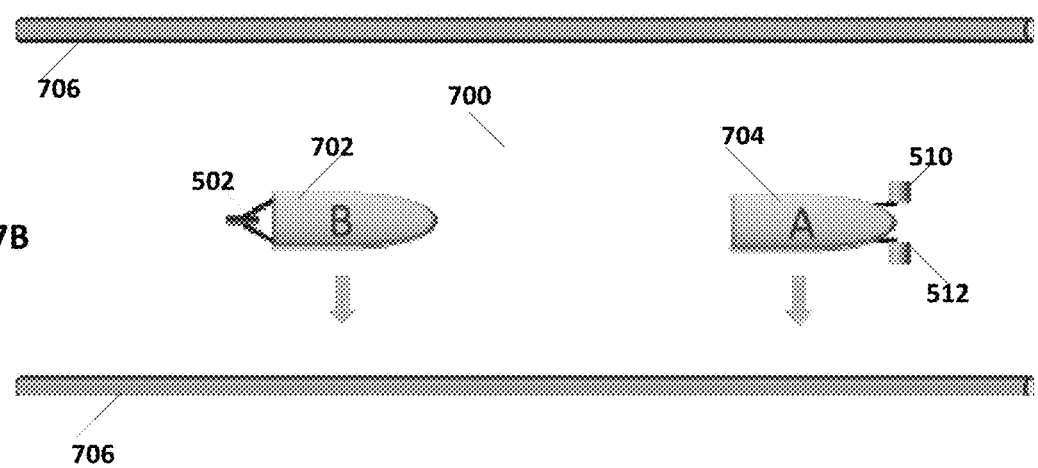

When the position of pipeline 706 is not known well enough to place platform 702 in its starting position, then both platform 702 and 704 cooperate to locate and lock onto it, as is illustrated in FIGS. 17A and 17B. In this case, platform 702 and platform 704 may line up and then both move sideways towards the expected location of pipeline 706. An increase in signal strength measured by platform 704 will occur if both cross the pipeline at approximately the same time, allowing platform 702 and platform 704 to establish contact. If no such contact is established another pass can be made at a slightly different heading to locate pipeline 706. FIGS. 17A and 17B illustrate platform 702 and platform 704 making two passes along different directions to locate pipeline 706. Again, the minimum separation distance may need to be satisfied in some cases, but not others. Once pipeline 706 is located, then the separation between platform 702 and platform 704 may be adjusted to fall within the separation range.

The above detailed description is provided to illustrate specific embodiments of the present invention and is not intended to be limiting. Numerous variations and modifications within the scope of the present invention are possible. The present invention is set forth in the following claims.

What is claimed is:

1. A locating system, comprising:
   a first mobile platform, the first mobile platform including a transmitter capable of inducing a current in a line;
   a second mobile platform, movement of the second mobile platform being independent of movement of the first mobile platform, the second mobile platform including a receiver capable of detecting the current in the line; and
   a processor coupled to the first platform and the second platform, the processor directing motion of the first platform and motion of the second platform to move the first platform and the second platform over the line and to direct collection of location data relative to the line,
   wherein the first mobile platform is directed on a path close to the line to induce a current in the line and the second mobile platform is directed in tandem with and spaced apart from the first mobile platform to detect the current induced in the line and provide location data.

2. The system of claim 1, wherein the line is a pipeline.

3. The system of claim 1, wherein the line is a cable.

4. The system of claim 3, wherein the cable is a single conductor cable.

5. The system of claim 3, wherein the cable includes multiple conductors.

6. The locating system of claim 1, wherein the first platform comprises:
   a first processor;
   a first navigation system coupled to the first processor, the first navigation system providing location, speed, direction, and orientation data to the first processor;
   a first drive system coupled to the first processor, the first drive system controlling a speed, direction, and orientation of the first platform;
   a first transmit driver coupled to the first processor, the first transmit driver driving a transmit coil mounted on the first platform; and
   a first communication system coupled to the first processor, the first communication system communicating to receive instructions.

7. The locating system of claim 6, wherein the second platform comprises:
   a second processor;
   a second navigation system coupled to the second processor;
   a second drive system coupled to the second processor, the second drive system controlling a speed, direction, and orientation of the second platform;
   a receiver coupled to the first processor, the receiver being coupled to one or more sensors configured to detect current in the pipeline; and
   a second communication system coupled to the second processor, the second communication system communicating to provide locate data.

8. The locating system of claim 7, wherein the processor is the second processor.

9. The locating system of claim 7, wherein the processor is the first processor.

10. The locating system of claim 7, further including a host platform, the host platform including the processor.

11. The locating system of claim 7, wherein the first platform also includes a receiver and the second platform also includes a transmitter.

12. The locating system of claim 11, wherein the transmitter of the first platform and the receiver of the second platform are tuned to a first frequency and wherein the transmitter of the second platform and the receiver of the first platform are tuned to a second frequency.

13. The locating system of claim 11, wherein the first platform transmits and the second platform receives or the first platform receives and the second platform transmits according to a timing sequence.

14. A method of operating a locating system that comprises a first platform with a transmitter and a second platform with a receiver over a line, comprising:

propelling the first platform over the line so that the transmitter induces a current in the line;

propelling the second platform independently of the first platform over the line such that the receiver detects presence of the line by detecting the current in the line; and directing direction of propulsion of the first platform and the second platform according to the detected presence of the line, wherein the first mobile platform is directed on a path close to the line to induce a current in the line and the second mobile platform is directed in tandem with and spaced apart from the first mobile platform to detect the current induced in the line and provide location data.

15. The method of claim 14, wherein the transmitter provides a continuous wave induction of current in the line.

16. The method of claim 14, wherein the first platform and the second platform communicate with a host platform.

17. The method of claim 14, wherein the line is a pipeline.

18. The method of claim 14, wherein the line is a single conductor or multiple conductor cable.

19. The method of claim 14, wherein the first platform and the second platform continue tracking over a ground site in the line.

20. The method of claim 19, comprising:
detecting presence of the ground site;
pausing the second platform when the ground site is detected;
moving the first platform ahead of the second platform; and
continuing collection of tracking data.

21. The method of claim 20, further including reversing direction of the first platform and the second platform until the ground site is detected a second time.

22. The method of claim 20, further including switching positions of the first platform and the second platform once sufficient distance is reached beyond the ground site.

23. The method of claim 19, wherein the first platform includes a receiver and the second platform includes a transmitter, and further including:
causing the first platform to switch to a receive mode and the second platform to switch to a transmit mode as the ground site is traversed.

24. The method of claim 19, wherein the first platform includes a receiver and the second platform includes a transmitter, and further including continuing to collect tracking data with both the first platform and the second platform as the ground site is traversed.

25. The method of claim 14, further including initially locating the line.

26. The method of claim 25, wherein further including initially locating the line comprises:
positioning the first platform at a known position of the line; and
directing the second platform across the line to locate the line.

27. The method of claim 26, wherein initially locating the line comprises:
traversing the first platform and the second platform in a lateral fashion to sweep across the line.

* * * * *